United States Patent [19]
Imao et al.

[11] Patent Number: 5,970,811
[45] Date of Patent: Oct. 26, 1999

[54] AUTOMATIC SPEED-CHANGE APPARATUS FOR A GEAR TRANSMISSION

[75] Inventors: Toshio Imao; Eiji Takeyama, both of Nagoya, Japan

[73] Assignee: Aichi Kikai Kogyo Kabushiki Kaisha

[21] Appl. No.: 09/121,663

[22] Filed: Jul. 23, 1998

[30] Foreign Application Priority Data

Aug. 15, 1997 [JP] Japan ..................................... 9-235413
Aug. 15, 1997 [JP] Japan ..................................... 9-235414

[51] Int. Cl.⁶ ............................ B60K 41/06; F02D 29/00
[52] U.S. Cl. ................................ 74/335; 74/325; 74/337.5
[58] Field of Search ............................. 74/325, 331, 335, 74/339, 340, 337.5, 473.36

[56] References Cited

U.S. PATENT DOCUMENTS

| | | | |
|---|---|---|---|
| 3,434,364 | 3/1969 | Keese | 74/325 X |
| 5,150,629 | 9/1992 | Morris et al. | 74/337.5 |
| 5,305,240 | 4/1994 | Davis et al. | 74/335 X |
| 5,590,563 | 1/1997 | Kuwahata et al. | 74/337.5 |
| 5,794,381 | 8/1998 | Rizkovsky | 74/337.5 X |
| 5,809,836 | 9/1998 | Patzold et al. | 74/337.5 |

FOREIGN PATENT DOCUMENTS

| | | |
|---|---|---|
| 0843112 | 5/1998 | European Pat. Off. . |
| 19627980 | 1/1997 | Germany . |
| 29622669 | 5/1997 | Germany . |
| 19734023 | 2/1998 | Germany . |
| 61-51697 | 11/1986 | Japan . |
| 05256359 | 10/1993 | Japan . |

*Primary Examiner*—Dirk Wright
*Assistant Examiner*—Peter T. Kwon
*Attorney, Agent, or Firm*—Dennison, Meserole, Scheiner & Schultz

[57] ABSTRACT

A speed-change apparatus for satisfactorily performing the automatic gear shifting of the conventional gear transmission by controlling two motors comprises a select mechanisms including a stepping-motor 2, a select shaft provided with a select gear meshing with a motor gear 3 for transferring the rotation, a device for connecting the select shaft with the select-shift rod of the gear transmission, and a select sensor 6 for detecting an angle of rotation of the select shaft; the shift mechanism comprises a shift motor 9, an intermediate shaft 12, an actuator gear 11 meshing with a motor gear 10 for transferring rotation, a long actuator gear 13 provided on the periphery of the intermediate shaft 12, a shift shaft provided with a male screw 15, a cylindrical slider 17 with a female screw 16 meshing with the male screw 15 a shift gear 14 meshing with the long actuator gear 13, a mechanism coupled with the slider 17 for connecting the slider 17 with the select-shift rod, and a stroke sensor 19 for detecting an amount of axial movement of the slider 17.

9 Claims, 6 Drawing Sheets

SHIFT PATTERN

AUTOMATIC SPEED-CHANGE APPARATUS FOR A GEAR TRANSMISSION

BACKGROUND OF THE INVENTION

1. Field of the Invention

The present invention relates to an automatic speed-change apparatus for a gear transmission.

2. Description of the Prior Art

In order to release the driver from the troublesome operation of the speed change in the gear transmission, there has been developed an apparatus in which the mechanism for the manual gear transmission is used as it is and the speed change and the clutch operation are automated through the hydraulic apparatus by the computer control. However, it requires three cylinders for clutching, shifting and selecting, and a number of electromagnetic valves to actuate these cylinders, and further requires a hydraulic system, so that it has such problems as complicated structure, large size and high cost.

Also, a speed-change apparatus in which motors are used as actuators to select or shift the gear transmission has been disclosed in JP publication Toku-ko-sho 61-51697, for example. However, this apparatus requires certain numbers of motors depending on the numbers of the select lines, and because of using a plurality of motors or solenoids, it results in a complicated structure and large size apparatus and further in high cost.

SUMMARY OF THE INVENTION

Accordingly, the present invention has been developed in order to solve the above problems in the prior art, and an object of the invention is to provide an automatic speed-change apparatus which has a simple structure and can automatically change the shifting positions of a conventional gear transmission.

Another object of the present invention is to provide an automatic speed-change apparatus which is made in light weight, compact and at a low cost.

A further object of the present invention is to provide an automatic speed-change apparatus which has a sensor for detecting the moved amount of an automatically controlled component which sensor is disposed compact and has a high durability.

A still further object of the present invention is to provide an automatic speed-change apparatus which can stand against a high load and can rapidly operate owing to improved moving-speed of the components.

Still another object of the present invention is to provide an automatic speed-change apparatus which is free from troubles of oil leak and maintenance.

To accomplish these objects described above, the automatic speed-change apparatus of the present invention has a select and a shift mechanism incorporated. The select mechanism comprises a select stepping-motor, a select shaft provided with a select gear meshing with a motor gear for transferring the rotation, a select connecting-means for connecting the select shaft with the select-shift rod of the gear transmission, and a select sensor for detecting an angle of rotation of the select shaft; and the shift mechanism comprises a shift motor, an intermediate shaft fixedly having an actuator gear meshing with a motor gear for transferring the rotation, a long actuator gear provided on the periphery of the intermediate shaft, a shift shaft provided with a male screw on the periphery thereof, a cylindrical slider provided on the inner periphery thereof with a female screw meshing with the male screw and provided on the outer periphery thereof with a shift gear meshing with the long actuator gear, a shift connecting-means coupled with the slider for connecting the slider with the select-shift rod, and a stroke sensor for detecting an amount of the axial movement of the slider or the shift connecting-means.

DESCRIPTION OF THE PREFERRED EMBODIMENT

With reference to the accompanying drawings, a preferred embodiment of the present invention will be described hereinafter.

Figure 1:
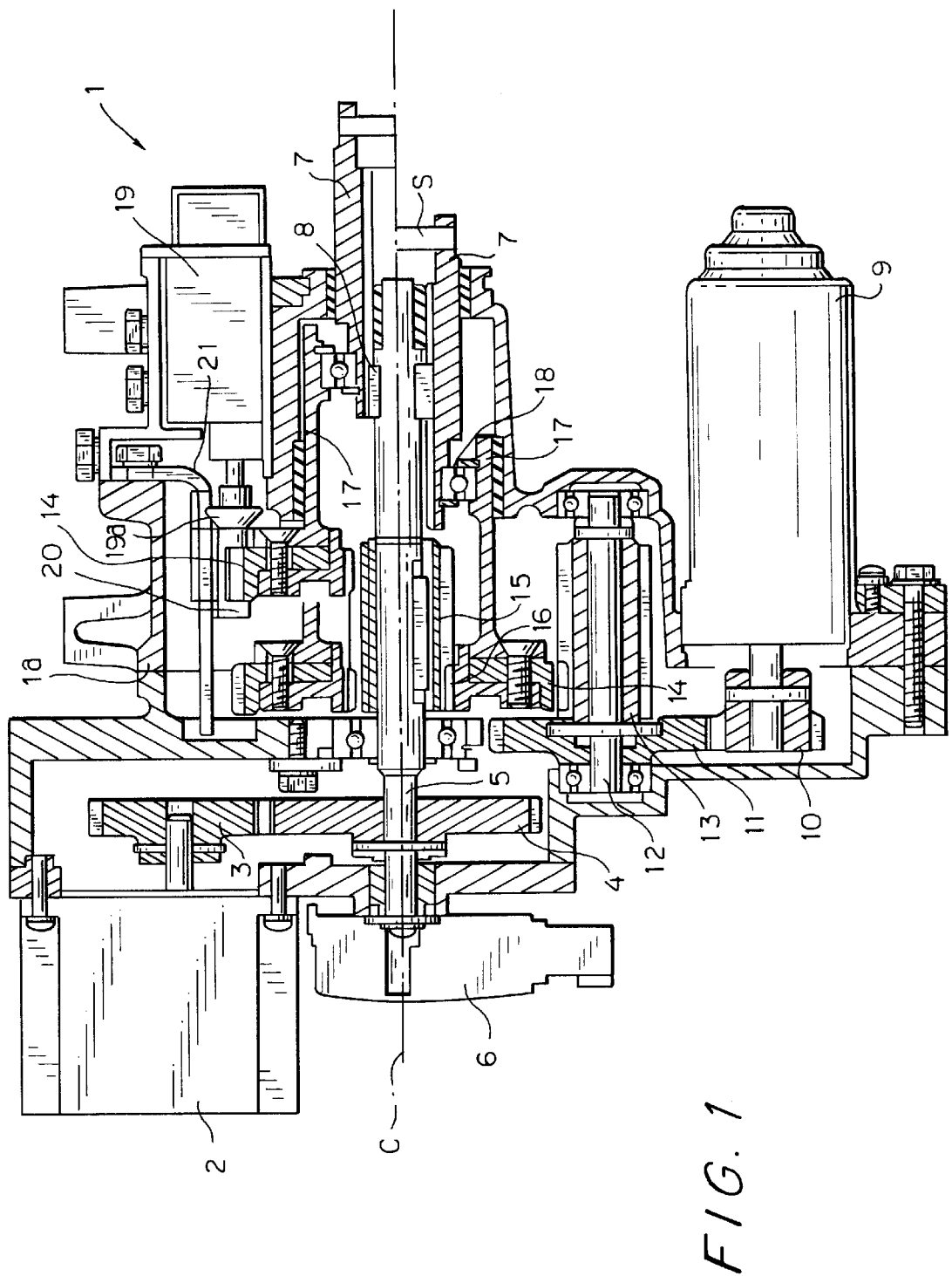
FIG. 1 is a sectional view of an automatic speed-change apparatus for automatically changing the shift position of a gear transmission.

FIG. 1 is a sectional view of an automatic speed-change apparatus 1 to be connected with a conventional gear transmission (not shown). This automatic speed-change apparatus 1 is connected with a select-shift rod extended out of the gear transmission and adapted automatically to select lines of the shift fork in the gear transmission by rotating the select-shift rod on its axis and automatically to shift the gears in the gear transmission by moving the select-shift rod in the axial direction.

Figure 3:
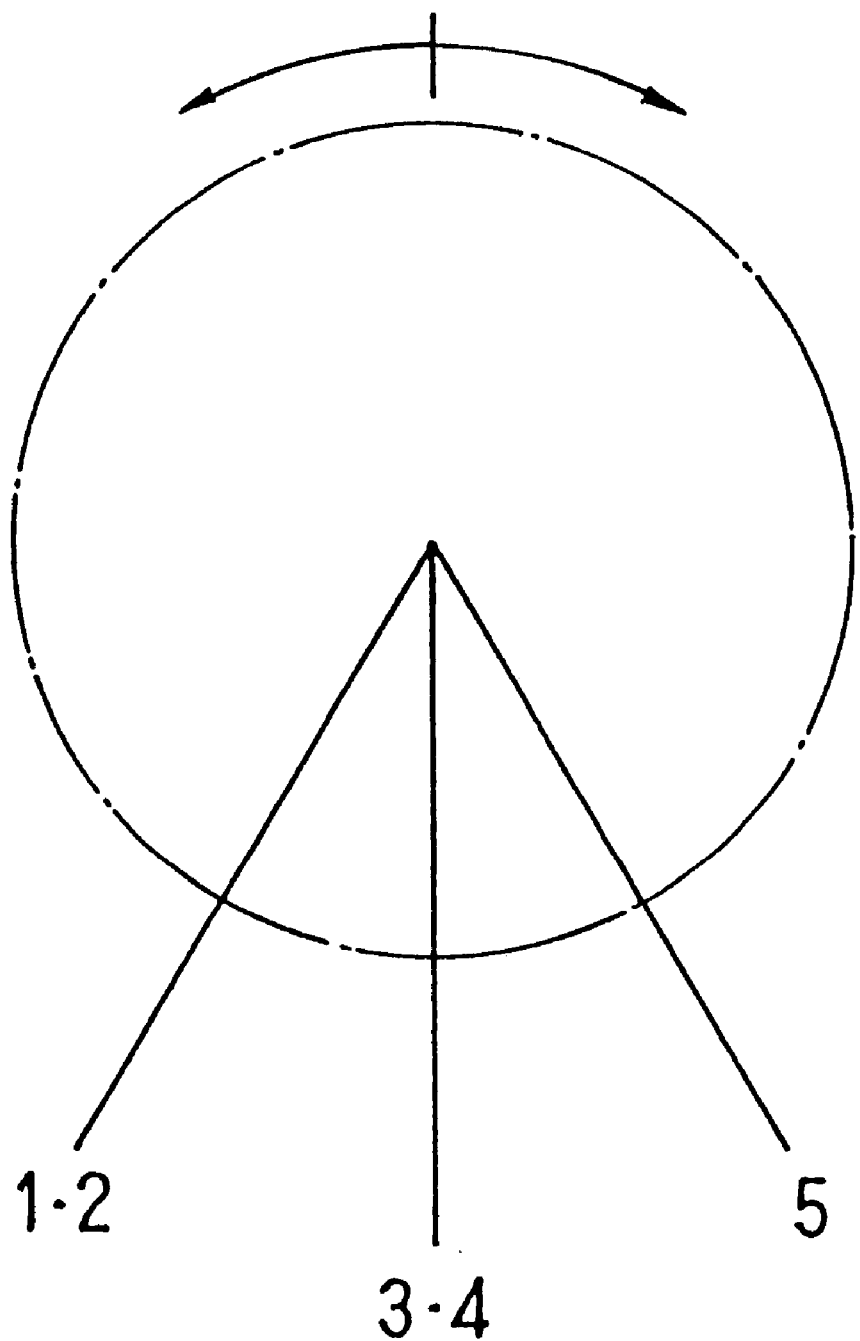
FIG. 3 is an illustration of select operation.

Namely, in the conventional gear transmission (not shown), by rotating the extended select-shift rod on its axis, a select line is selected within the gear transmission, as shown in a diagram of the select operation of FIG. 3. As shown in FIG. 3, by rotating the select-shift rod clockwise on its axis the low or the second speed position can be selected, and also by rotating it counterclockwise the fifth speed or R(reverse) position can be selected, and by putting it on the center shifting line the third or the fourth speed position can be selected.

Figure 4:
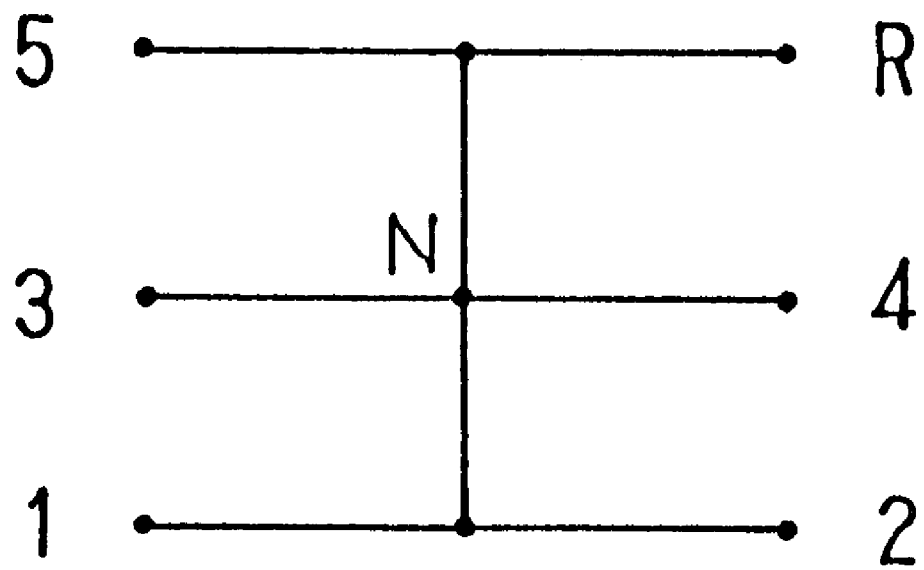
FIG. 4 is a diagram of a shift pattern.

After a shifting line in the transmission is selected as described above, by moving the select-shift rod in the axial direction, the shift fork (not shown) in the transmission is subsequently moved, and the inner gear is shifted in the required low or second position, for example, as shown in a diagram of the shift pattern of FIG. 4. Thus, the speed-change operation can be completed. The select and the shift mechanism for performing such a select and a shift operation are incorporated in the automatic speed-change apparatus 1 as shown in FIG. 1.

In the upper and the lower side of the center line C, FIG. 1 shows the different conditions of the automatic speed-change apparatus 1 where the slider 17 and the sleeve 7 have been moved in different locations. In the outside of the housing 1a of the automatic speed-change apparatus 1 is provided a select stepping-motor 2, which is controllable for forward and backward rotation, so that it can be controlled to rest at a desired angle of rotation. On the motor shaft of this select stepping-motor 2 is fixedly provided a motor gear 3, which is made to mesh with a select gear 4. This select gear 4 is fixedly provided on a select shaft 5. On the left end, shown in the drawing, of the select shaft 5 is provided a select sensor 6 which can detect an operating angle of rotation of the select shaft 5. Also, on the right periphery, shown in the drawing, of the select shaft 5 is fitted a sleeve 7 which is nonrotatable and movable in the axial direction only by means of slide keys 8. The select stepping-motor 2, select gear 4, select shaft 5, select sensor 6, and sleeve 7 constitute a select mechanism which can rotate the select-shift rod of the gear transmission on its axis.

In the lower portion of FIG. 1 is provided a shift motor 9 composed of an ordinary motor, on the motor shaft of which is fixedly provided a motor gear 10. This motor gear 10 is made to mesh with an actuator gear 11 which is fixedly provided on an intermediate shaft 12. On the periphery of the right side from the actuator gear 11, shown in the drawing, of the intermediate shaft 12 is fixedly fitted a long actuator gear 13 formed long in the axial direction. This long actuator gear 13 is made to mesh with a shift gear 14, in the inside of which is fixed a female screw 16. Moreover, on the shift gear 14 is integrally fixed a slider 17 extending in the axial direction. The female screw 16 is meshed with a male screw 15 fixedly fitted on the select shaft 5, which is formed long in the axial direction. In the inside of the right end of the slider 17 is provided a slider bearing 18, in the inside of which is connected with the sleeve 7. On the right end of the sleeve 7 is provided a connecting member S for coaxially connecting the select-shift rod of the gear transmission (not shown). Through this connecting member S the sleeve 7 is coaxially connected with the select-shift rod.

Figure 2:
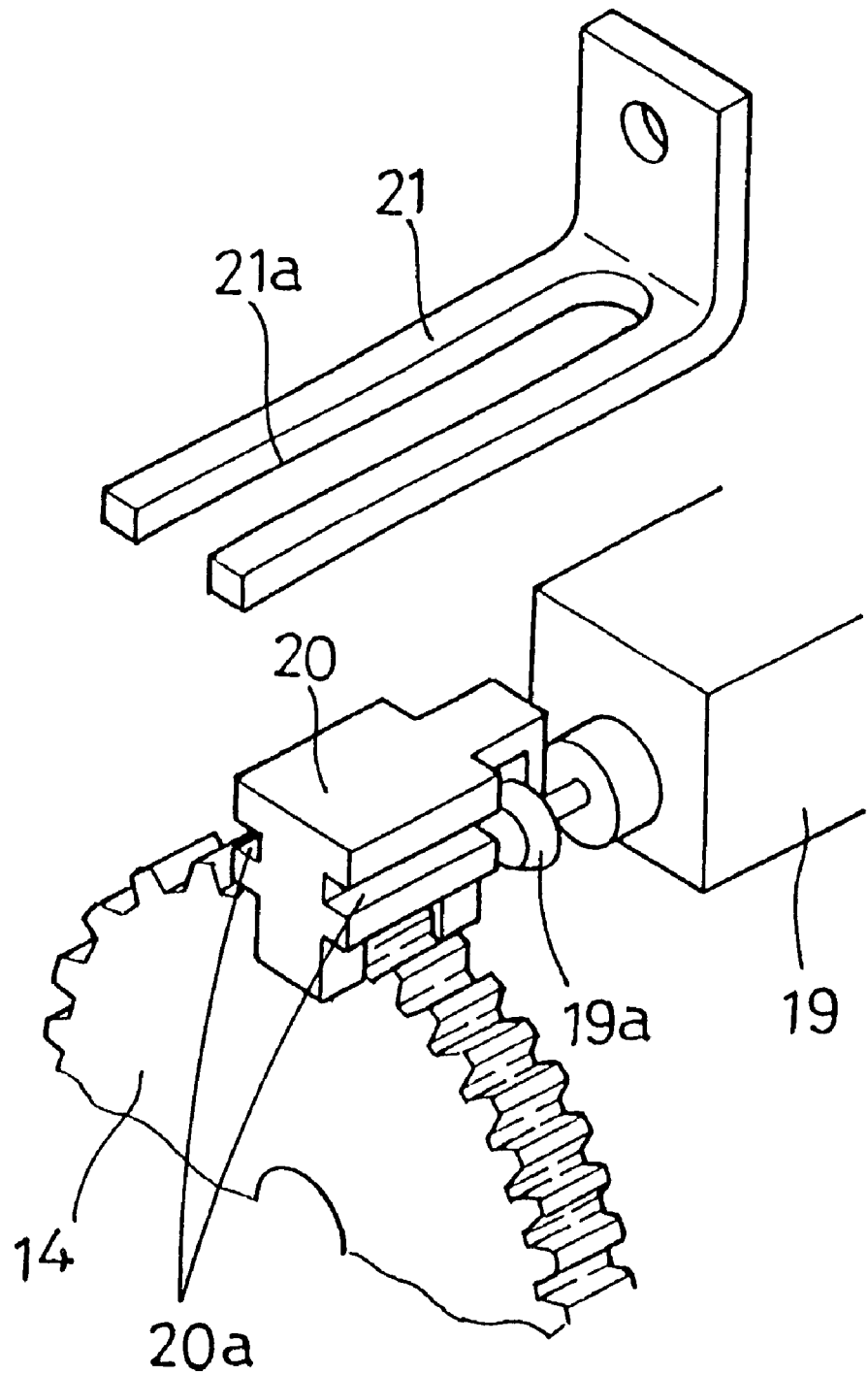
FIG. 2 is an exploded perspective view of a guide bracket and a slide piece and vicinity of a stroke sensor in FIG. 1.

On the periphery of the shift gear 14 is disposed a slide piece 20, as shown in FIG. 2, extending over both side surfaces of the shift gear 14. This slide piece 20 is axially movably mounted on a guide bracket 21 of which one end is fixed to the housing 1a; the inside of U-shaped slot 21a of the guide bracket 21 is inserted in guide grooves 20a formed in the slide piece 20. The right surface of this slide piece 20, shown in the drawing, is brought into contact with a contact member 19a extending from a stroke sensor 19. Consequently, this stroke sensor 19 is adapted to detect the amount of axial movement of the shift gear 14 and slider 17 according to the amount of axial movement of the contact member 19a in contact with the slide piece 20. Since the contact member 19a is not directly brought into contact with the shift gear 14, it is prevented for the contact member 19a to be wore or for the shaft of the stroke sensor 19 to be bent.

Moreover, in the automatic speed-change apparatus 1 of this embodiment, the actuator gears 3, 4, 10, 11, 13, 14 are respectively formed of nylon resin. The bearing 18 is composed of a prelubricated ball bearing. The male screw 15 is formed of carbon steel and the female screw 16 is formed of brass. The slide key 8 is formed of polyimide resin. The plain bearings for the sliders 17 and the sleeve 7 are made of PTFE resin.

Namely, the automatic speed-change apparatus 1 of this embodiment is constituted in the dry condition by using the materials and components which are usable without oiling, so that it is possible to be free of the maintenance.

Also, since trapezoidal multiple thread screws are employed for the male screw 15 and the female screw 16, the apparatus 1 comes to have a structure that can endure high loads and can increase the moving speed of the slider 17.

During the select operation in such an automatic speed-change apparatus 1, the shift motor 9 is made in no load condition. In this condition, when the select stepping-motor 2 is made in operation, the select gear 4 is rotated following the rotation of the motor gear 3, accordingly the select shaft 5 is rotated, also the sleeve 7 fitted on this select shaft 5 is rotated, and then the select-shift rod of the gear transmission (not shown) is rotated in connected condition with the sleeve 7. The angle of rotation of this select-shift rod can be controlled in a desired angle of rotation by gradationally operating the select stepping-motor 2. In this case, the detecting signal from the select sensor 6 is returned as a feedback, and the select-shift rod is displaced through the sleeve 7 in an angle of rotation corresponding to the desired select-line. Thus, the select operation is performed to select a line of the shift fork in the inside of the gear transmission.

During the shift operation, the select stepping-motor 2 is stopped at a desired angle to generate a holding force and thereby the select shaft 5 is made in a stationary condition where no rotation is allowable. Consequently, the male screw 15 fitted on the select shaft 5 is also held in a stationary condition. In this condition, when the shift motor 9 is operated, the intermediate shaft 12 is rotated through the actuator gear 11, and accordingly the long actuator gear 13 is rotated to transfer the rotating force to the shift gear 14. When the shift gear 14 is rotated, the slider 17 is moved as it rotates through the female screw 16 on the male screw 15 in the axial direction or in the right direction, shown in the drawing. Following this, the shift gear 14 is axially moved as it rotates meshing with the long actuator gear 13. Since the rotating force of the slider 17 is absorbed by the slider bearing 18, the rotating force is not transmitted to the sleeve 7, which is moved in the axial direction only by receiving the axial moving force of the slider 17. Thereby, the select-shift rod of the gear transmission (not shown), connected with the sleeve 7, is axially moved to operate the shift fork subsequently in the inside of the gear transmission, so that the shift operation of the gear can be performed in the gear transmission. In this case, the amount of the axial movement of the slider 17 is detected by the above-described stroke sensor 19, and this detecting signal is returned as a feedback to the shift motor 9 to control it, and thereby the sleeve 7 is axially moved to the desired location and the gear transmission is shifted to the desired shift position.

As described above, this embodiment can automatically perform the efficient select and shift operations in a simple structure having two motors for select and shift.

Figure 5:
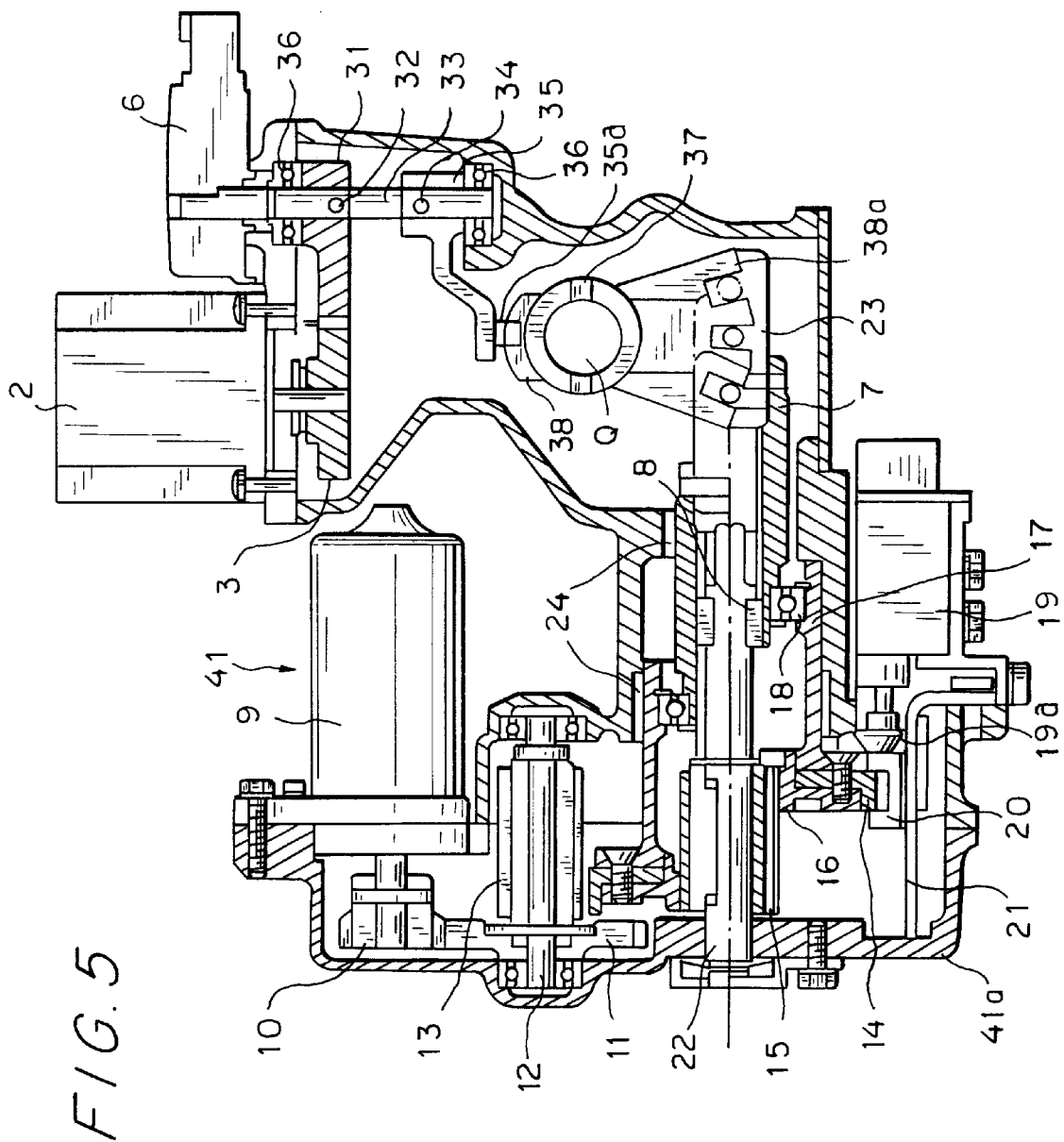
FIG. 5 is a sectional view of an automatic speed-change apparatus of another embodiment.

Next, FIG. 5 is a sectional view of an automatic speed-change apparatus 41 as another embodiment of the present invention. This automatic speed-change apparatus 41 is connected with a select-shift rod Q extended out of the conventional gear transmission and adapted automatically to select lines of the shift fork in the gear transmission by moving the select-shift rod Q in the axial direction and automatically to shift the gears in the gear transmission by rotating the select-shift rod Q on its axis.

Figure 6:
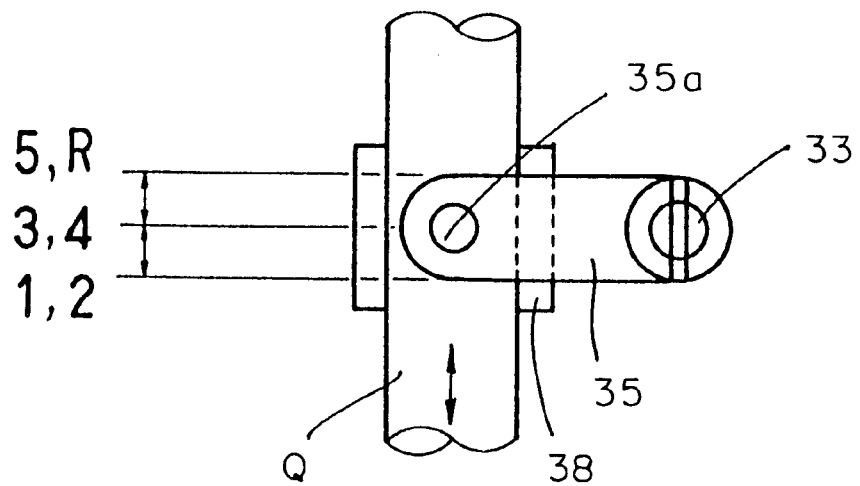
FIG. 6 is an illustration of select operation of another embodiment.

Namely, in the this gear transmission, by moving the extended select-shift rod Q in its axial direction, a select line is selected within the gear transmission, as shown in a diagram of the select operation of FIG. 6. By the axial movement of the select-shift rod Q, the low or the second speed position can be selected, and also the fifth speed or R(reverse) position can be done, and further by putting it on the center shifting line the third or the fourth speed position can be selected.

Figure 7:
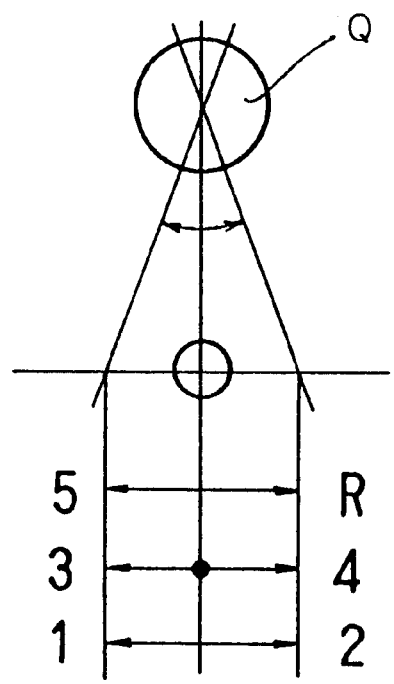
FIG. 7 is a diagram of a shift pattern of another embodiment.

After a shifting line in the gear transmission is selected as described above, by rotating the select-shift rod Q on its axis, as shown in a diagram of the shift pattern of FIG. 7, the shift fork (not shown) in the transmission is subsequently moved, and the inner gear is shifted in the required position. Thus, the speed-change operation can be completed. The select and the shift mechanism for performing such a select and a shift operation are incorporated in the automatic speed-change apparatus 41 as shown in FIG. 5.

The automatic speed-change apparatus 41 in FIG. 5 is surrounded by a housing 41a, and in the upper portion is disposed a select stepping-motor 2. On the motor shaft of this select stepping-motor 2 is fixed a motor gear 3, which is meshed with a select gear 31 formed in a sector. The select gear 31 is fixed to a select shaft 33 with a fixing pin 32. On the upper end of the select shaft 33 is provided a select sensor 6 for detecting the angle of rotation of the select shaft 33. Also, on the lower end of the select shaft 33 is fixedly provided a sellect lever 35 through a fixing pin 34, and the select shaft 33 is rotatably supported with ball-bearings 36.

The select lever 35 is connected at the tip end 35a with a select shift lever 38, which is fixed to the select-shift rod Q through a fixing pin 37. The select-shift rod Q is extended out of the gear transmission (not shown) to connect the automatic speed-change apparatus 41 with the gear transmission. Also, the select-shift lever 38 is engaged at its tip 38a with a coupling member 23 which will be described later. The select stepping-motor 2, motor gear 3, select gear 31, select shaft 33, select lever 35, select-shift lever 38, and select sensor 6 constitute a select mechanism.

On the housing 41a is, provided a shift motor 9, on the motor shaft of which is fixedly provided a motor gear 10. This motor gear 10 is made to mesh with an actuator gear 11 which is fixedly provided on an intermediate shaft 12 which is rotatably supported through ball-bearing. On the periphery of the intermediate shaft 12 is fixedly fitted, through a pin, a long actuator gear 13 formed long in the axial direction. This long actuator gear 13 is made to mesh with a shift gear 14, in the inside of which is fixed a female screw 16. Moreover, on the shift gear 14 is integrally fixed a slider 17 extending in the axial direction. The female screw 16 in the inside of the shift gear 14 is meshed with a male screw 15 which is inserted and fixed through a key on the periphery of a shift shaft 22 fixedly provided on the housing 41a. Thereby, the shift gear 14 can axially move along this male screw 15. Also, on the periphery of the shift shaft 22 is fitted a sleeve 7 through a slide key 8 unrotatably on its axis and movably in the axial direction only. This sleeve 7 is connected with the end of the slider 17 through a slider bearing 18. On the other end of the sleeve 7 is provided a coupling member 23, which is connected with the tip of the select-shift lever 38.

Also, on the periphery of the shift gear 14 is disposed a slide piece 20 extending over both end surfaces of the shift gear 14, as shown in the exploded view of FIG. 2. This slide piece 20 is axially movably mounted on a guide bracket 21 of which one end is fixed to the housing 41a; the inside of U-shaped slot 21a of the guide bracket 21 is inserted in guide grooves 20a formed in both sides of the slide piece 20. This slide piece 20 is brought into contact with a contact member 19a of a stroke sensor 19. This stroke sensor 19 is adapted to detect the amount of axial movement of the slider 17.

The automatic speed-change apparatus 41 of this embodiment is also constituted in the dry condition by using the materials and components which are usable without oiling, so that it is possible to be free of the maintenance.

Also, since the male screw 15 and the female screw 16 made of trapezoidal multiple thread screws are employed, the apparatus 41 comes to have a structure that can endure high loads and can increase the moving speed.

During the select operation in such an automatic speed-change apparatus 41 as shown in FIG. 5, the select stepping-motor 2 is made in operation, thereby the motor gear 3 is rotated, and through the select gear 31 in a sector form the select shaft 33 is displaced in the direction of rotation. Accordingly, the select lever 35 fixed to the select shaft 33 is swung, and the select-shift rod Q is moved in its axial direction through the select-shift lever 38, as shown in FIG. 6. In this case, the detecting signal from the select sensor 6 is returned as a feedback properly to control the select stepping-motor 2, and the select-shift rod Q is caused to move in the desired select line.

Next, during the shift operation, when the shift motor 9 is operated, through the actuator gears 10, 11 the intermediate shaft 12 is rotated, and accordingly the shift gear 14 engaging with the long actuator gear 13 is rotated. Since the female screw 16 within the shift gear 14 is meshed with the male screw 15 fixed to the shift shaft 22, the shift gear 14 is axially moved along the male screw 15 as it rotates. According to the axial movement of the shift gear 14, the slider 17 connected integrally with it is caused to move, as it rotates, in its axial direction. Since the rotation of the slider 17 is absorbed by the slider bearing 18, only the axial moving force of the slider 17 is transferred to the sleeve 7, which is axially moved. Thereby, the coupling member 23 is axially moved, causing the tip 38a of the select-shift lever 38 to swing, so that the select-shift rod Q is caused to be displaced in the direction of rotation. In this case, the amount of the axial movement of the slider 17 is detected by the above-described stroke sensor 19, and this detecting signal is returned as a feedback to the shift motor 9 to control it. Thus, the select-shift rod Q is displaced to the desired shift position, and the shift operation comes to be completed.

What is claimed is:

1. An automatic speed-change apparatus for a gear transmission having a select-shift rod extended out thereof;

said automatic speed-change apparatus connected with said select-shift rod for performing automatic shift operation of said gear transmission by converting driving force of motors into the rotational and the axial movement of said select-shift rod to transfer the movement to the shift fork of the transmission;

said automatic speed-change apparatus provided with a select mechanism for performing the select operation and a shift mechanism for performing the shift operation;

said select mechanism comprising a select stepping-motor (2) rotatable for forward and backward and controllable for any desired angle of rotation, a select shaft fixedly provided with a select gear meshing with a motor gear (3) of said select motor (2) for transferring the rotation, a select connecting-means for connecting said select shaft with said select-shift rod, and a select sensor (6) for detecting an angle of rotation of said select shaft; and said shift mechanism comprising a shift motor (9) for forward and backward, an intermediate shaft (12) fixedly having an actuator gear (11) meshing with a motor gear (10) of said shift motor (9) for transferring the rotation, a long actuator gear (13) provided on the periphery of said intermediate shaft (12), a shift shaft provided with a male screw (15) on the periphery thereof, a cylindrical slider (17) provided on the inner periphery thereof with a female screw (16) meshing with said male screw (15) and provided on the outer periphery thereof with a shift gear (14) meshing with said long actuator gear (13), a shift connecting-means coupled with said slider (17) for connecting said slider (17) with said select-shift rod, and a stroke sensor (19) for detecting an amount of the axial movement of said slider (17) or said shift connecting-means; wherein, during the select operation, under the feedback control by said select sensor (6) the driving force of said select stepping-motor (2) causes said select shaft to rotate at a desired angle of rotation to select a shifting line in said gear transmission through said select-shift rod; and thereafter during the shift operation, under the feedback control by said stroke sensor (19) the driving force of said shift motor (9) causes said intermediate shaft (12) to rotate through said actuator gear (11) to rotate said shift gear (14) meshing with said long actuator gear (13) and at the same time said slider (17) axially moves owing to meshing of said male and said female screw to perform the gear shifting on the selected shifting line in said gear transmission through said select-shift rod.

2. An automatic speed-change apparatus for a gear transmission as defined in claim 1, wherein said gear transmission is constituted so that the shifting line may be selected by the rotation of said select-shift rod on its axis and the gear shifting on the selected shifting line may be performed by the axial movement of said select-shift rod; said select connecting-means in said select mechanism comprises a sleeve (7) fitted on the periphery of the end of said select shaft (5) through a slide key (8) so as to be relatively nonrotatable; said shift shaft in said shift mechanism is the same as the select shaft (5) in said select mechanism and said shift connecting-means comprises said sleeve (7) coupled with said slider (17) through a slider bearing (18) so as to be axially movable along said select shaft (5); during the select operation the rotation of said select shaft (5) is transferred to said select-shift rod through said sleeve (7); and during the shift operation, in the stationary condition of said male screw (15) on said select shaft (5) due to the holding force generated by said select stepping-motor (2), said shift motor (9) is operated to transfer the axial movement of said slider (17) to said select-shift rod through said sleeve (7).

3. An automatic speed-change apparatus for a gear transmission as defined in claim 1, wherein said gear transmission is constituted so that the shifting line may be selected by the axial movement of said select-shift rod and the gear shifting on the selected shifting line may be performed by the rotation of said select-shift rod on its axis; the select gear (31) in said select mechanism is made in a sector form, and said select connecting-means comprises a select lever (35) fixed to the end of said select shaft (33) and a select-shift lever (38) fixed to said select-shift rod for connecting the tip (35a) of said select lever (35); said shift shaft (22) in said shift mechanism is fixed to the housing (1a), and said shift connecting-means comprises a sleeve (7) fitted on the periphery of the end of said shift shaft (22) so as to be nonrotatable and axially movable and a coupling member (23) for coupling the end of said sleeve (7) with the tip (38a) of said select-shift lelver (38); during the select operation said select shaft (33) is rotated at a desired angle of rotation through said select gear (31), said select lever (35) is swung, and said select-shift rod is axially moved through said select-shift lever (38); and during the shift operation the tip (38a) of said select-shift lever (38) is swung by said coupling member (23) fixed to said sleeve (7) so that said select-shift rod is rotated on its axis.

4. An automatic speed-change apparatus for a gear transmission as defined in claim 2, wherein said stroke sensor (19) includes a slide piece (20) extending over both side surfaces of said shift gear (14) and axially moving as rotatably holding said shift gear (14) and a guide bracket (21) fixed to the housing (1a) at its one end for holding said slide piece (20) to axially guide and move it, and is adapted to detect the amount of axial movement of said slider (17) through a contact member (19a) of said stroke sensor (19) in contact with the end surface of said slide piece (20).

5. An automatic speed-change apparatus for a gear transmission as defined in claim 2, wherein said male screw (15) on said select shaft (5) or said shift shaft (22) and said female screw (16) on said slider (17) engaging with said male screw (15) are composed of trapezoidal multiple thread screws.

6. An automatic speed-change apparatus for a gear transmission as defined in claim 2, wherein said select mechanism and said shift mechanism are constituted in dry condition by adopting gears, bearings, male screws, female screws, tips of levers, coupling members or the like made of the materials and components requiring no oiling in use.

7. An automatic speed-change apparatus for a gear transmission as defined in claim 3, wherein said stroke sensor (19) includes a slide piece (20) extending over both side surfaces of said shift gear (14) and axially moving as rotatably holding said shift gear (14) and a guide bracket (21) fixed to the housing (1a) at its one end for holding said slide piece (20) to axially guide and move it, and is adapted to detect the amount of axial movement of said slider (17) through a contact member (19a) of said stroke sensor (19) in contact with the end surface of said slide piece (20).

8. An automatic speed-change apparatus for a gear transmission as defined in claim 3, wherein said male screw (15) on said select shaft (5) or said shift shaft (22) and said female screw (16) on said slider (17) engaging with said male screw (15) are composed of trapezoidal multiple thread screws.

9. An automatic speed-change apparatus for a gear transmission as defined in claim 3, wherein said select mechanism and said shift mechanism are constituted in dry condition by adopting gears, bearings, male screws, female screws, tips of levers, coupling members or the like made of the materials and components requiring no oiling in use.

* * * * *